United States Patent [19]
Gant et al.

[11] Patent Number: 4,796,900
[45] Date of Patent: Jan. 10, 1989

[54] WORKPIECE HOLDING ASSEMBLY FOR A CHUCK

[76] Inventors: Eugene Gant, 4605 Merrydale Ave., Dayton, Ohio 45431; Richard Spangler, 3924 Cloverdale Rd., Medway, Ohio 45341

[21] Appl. No.: 163,779

[22] Filed: Mar. 3, 1988

[51] Int. Cl.$^4$ ............................................. B23B 31/16
[52] U.S. Cl. ................................. 279/123; 269/262; 279/1 A; 279/1 SJ
[58] Field of Search ............... 279/1 A, 1 SJ, 123; 269/259, 262, 271, 279, 280, 282

[56] References Cited

U.S. PATENT DOCUMENTS

| | | | |
|---|---|---|---|
| 2,690,915 | 10/1954 | Pealer | 279/123 X |
| 2,708,118 | 5/1955 | Kuchenbrod | 279/123 |
| 2,896,958 | 7/1959 | Strauss | 279/123 |
| 3,945,654 | 3/1976 | McMullen | 279/123 |
| 4,270,763 | 6/1981 | Rohm | 279/123 |
| 4,362,306 | 12/1982 | Rohm | 279/121 |
| 4,706,973 | 11/1987 | Covarrubia et al. | 279/1 SJ |

FOREIGN PATENT DOCUMENTS

| | | | |
|---|---|---|---|
| 104286 | 4/1984 | European Pat. Off. | 269/262 |
| 211807 | 9/1983 | Japan | 279/123 |
| 910370 | 3/1982 | U.S.S.R. | 279/123 |
| 148383 | 7/1920 | United Kingdom | 279/123 |

*Primary Examiner*—Gil Weidenfeld
*Assistant Examiner*—Stephen Bishop
*Attorney, Agent, or Firm*—Ralph L. Marzocco

[57] ABSTRACT

A workpiece holding assembly for use on a chuck includes a chuck jaw and an adjustable self-centering workpiece holder. The chuck jaw has an elongated body with opposite ends, a groove defined in one end of the body, and a pair of arcuate recesses formed in the one body end on opposite sides of the groove. The workpiece holder includes a shaft portion and a base portion attached about a midsection of the shaft portion such that the holder has an integral, one-piece construction. The shaft portion is of generally cylindrical shape adapted to extend into the arcuate recesses of the one chuck jaw body end. The base portion is of greater than semi-circular shape and adapted to extend into the groove of the one chuck jaw body end. The base portion also has a generally semi-circular closed slot defined therethrough adapted to receive at least one fastener therethrough being fastenable to the one chuck jaw body for releasably clamping the base portion in the groove. The shaft and base portions have a common central axis and a workpiece engaging notch defined therein extending generally parallel to the common central axis thereof. The base portion is rotatable in the groove and the shaft portion is rotatable in the recesses for adjusting the angular position of the shaft and base portions and thereby of the notch relative to the chuck jaw body end before clamping of the base portion in the groove thereof.

19 Claims, 2 Drawing Sheets

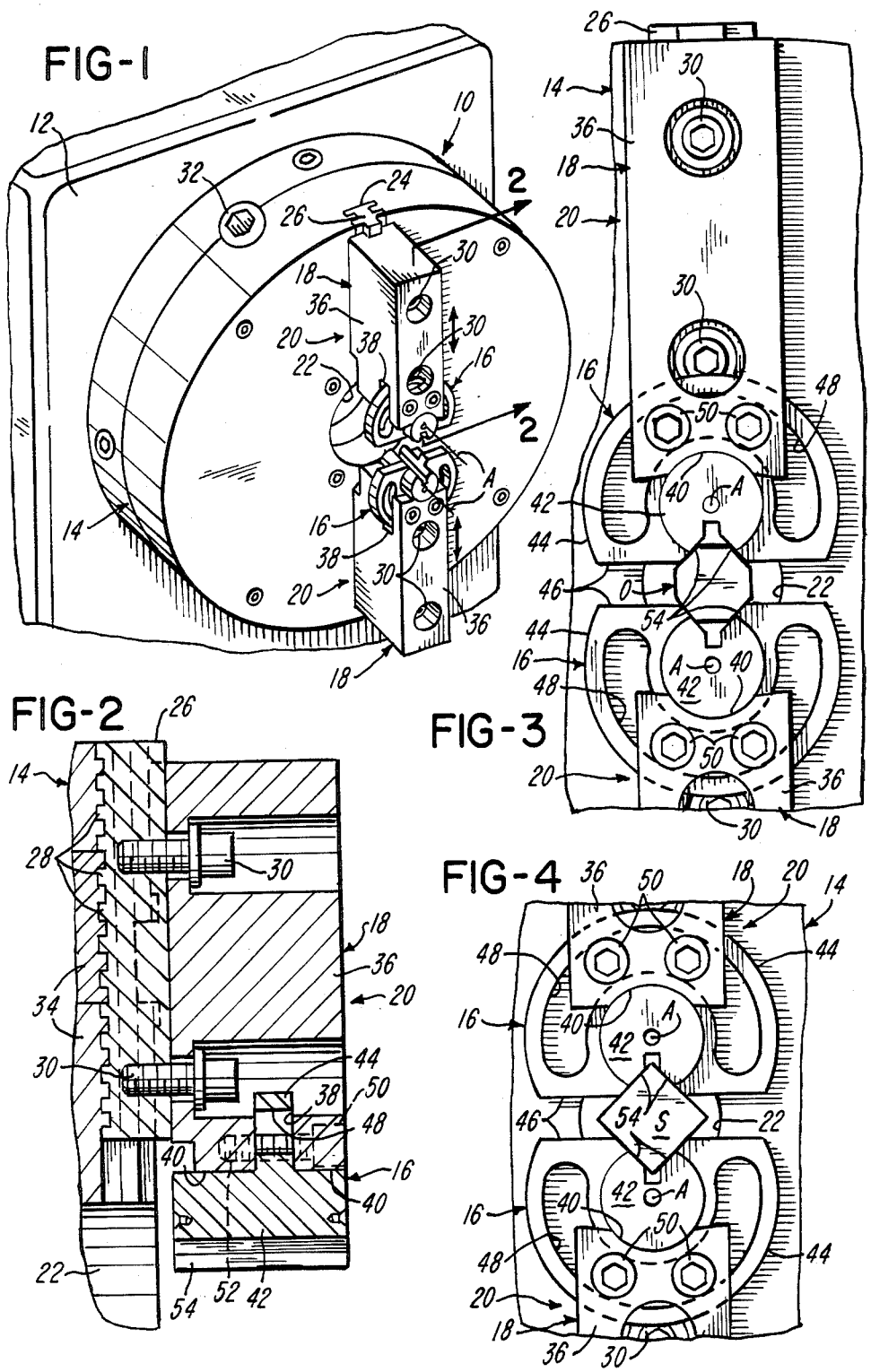

U.S. Patent      Jan. 10, 1989      Sheet 2 of 2      4,796,900
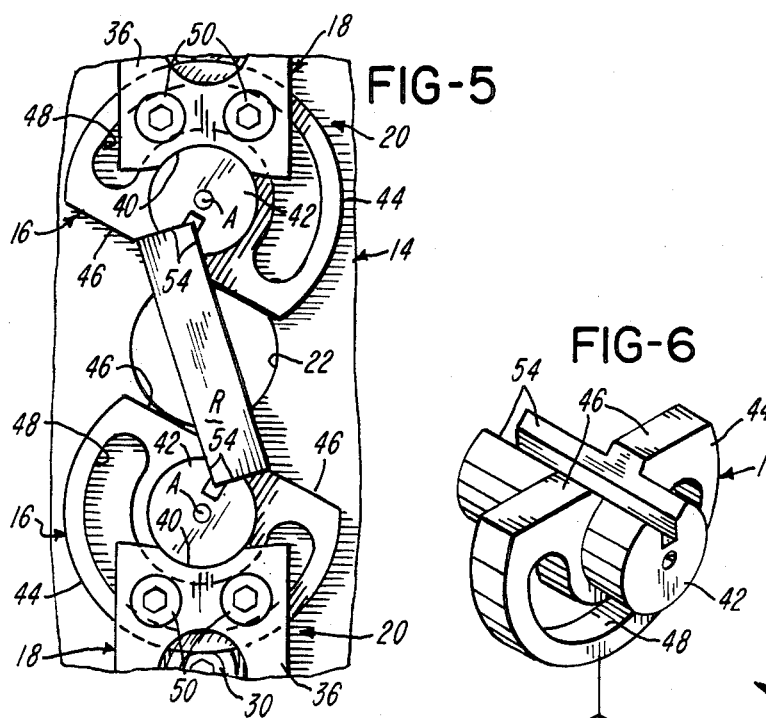
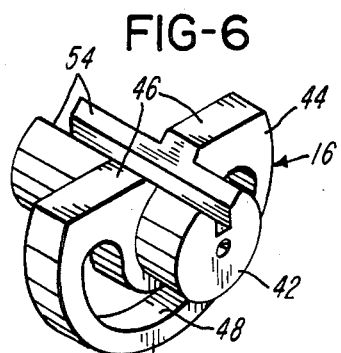
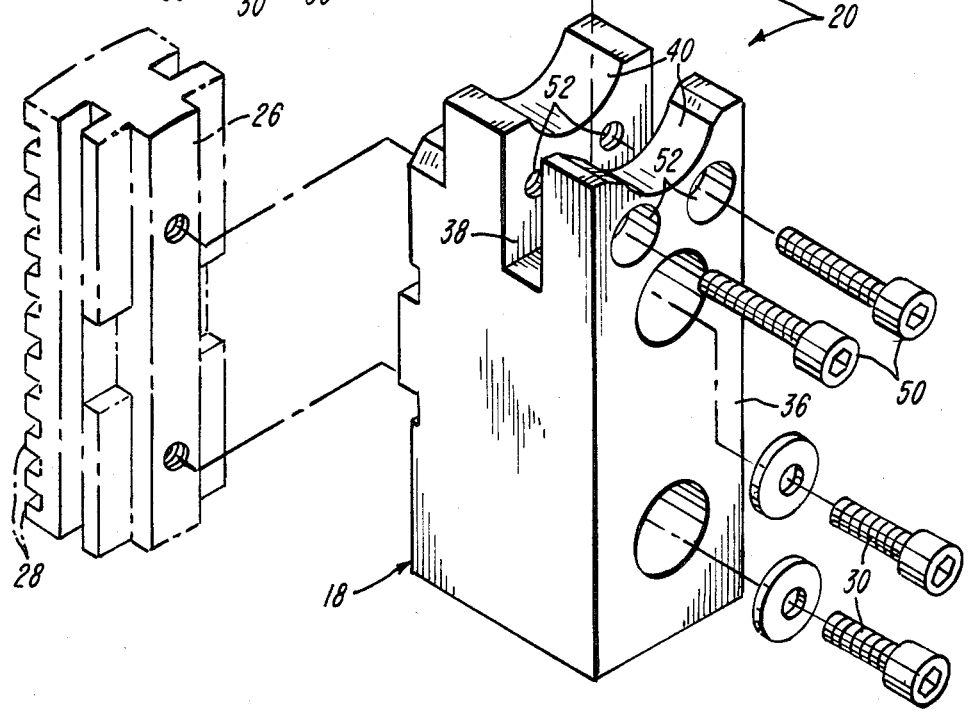

WORKPIECE HOLDING ASSEMBLY FOR A CHUCK

BACKGROUND OF THE INVENTION

1. Field of the Invention

The present invention relates generally to chucks and, more particularly, is concerned with a workpiece holding assembly for use on the chuck.

2. Description of the Prior Art

Rotary machining apparatuses, such as lathes and grinding machines, are customarily equipped with chucks to grip and center a workpiece. Typically, a chuck has jaws movably mounted on guideways extending in radial relation to a central rotational axis of the apparatus. The jaws are opened or closed relative to the workpiece upon being radially moved simultaneously along the guideways by turning a pinion to cause rotation of a helical track or scroll engaged with the jaws. Representative of the prior art are the chucks disclosed in U.S. Pat. Nos. to Kuchenbrod (2,708,118), Strauss (2,896,958), McMullen (3,945,654), and Rohm (4,270,763 and 4,362,306); in a British patent to Friedmann (No. 148,383): in a Japanese patent to Kitagawa (58-211807): in a Russian inventor's certificate to Azerb Poly (No. 910,370); and in catalog 84 of the Buck Chuck Company of Kalamazoo, Mich.

One approach to increasing the versatility and usefulness of a given chuck is exemplified by the Kuchenbrod patent. In this patent, adjustable jaw assemblies are provided for attachment to the master jaws of the chuck. The jaw assemblies can be adjusted to grip odd or irregular workpieces and are capable of holding them more securely than are the master jaws of the chuck.

The basic approach of the Kuchenbrod patent appears to offer promise as a way to increase the versatility and usefulness of a chuck. However, the particular jaw assemblies proposed in this patent are believed to have several drawbacks. They are composed of too many parts, their design seems unduly complex, and their fabrication would probably be too costly for them to be practical.

Consequently, a need exists for improvement of the approach taken in the Kuchenbrod patent to increase the versatility and usefulness of a workpiece holding and centering chuck.

SUMMARY OF THE INVENTION

The present invention provides self-centering adjustable workpiece holders and a workpiece holding assembly designed to satisfy the aforementioned needs. The workpiece holding assembly of the present invention is employed on a conventional chuck body so as to expand the versatility of the chuck by facilitating the gripping of workpieces having diverse shapes, such as rectangular, square, and octagonal shapes to name a few. The self-centering adjustable workpiece holders are each one-piece parts identical to and interchangeable with one another. The holders are fabricated by use of conventional techniques, such as machining from solid stock, casting or any other suitable method. Only minimal changes need to be made to an existing jaw to provide the modifications thereto necessary to mount one of the holders to it. Therefore, the workpiece holders of the present invention avoid all of the shortcomings associated with the jaw assemblies of the Kuchenbrod patent.

Accordingly, the present invention is directed to an adjustable workpiece holder for use on a chuck jaw. The workpiece holder comprises: (a) a base portion adapted to extend into a groove defined in an end of the chuck jaw, the base portion having an arcuate shaped slot defined therethrough adapted to receive at least one fastener therethrough for releasably clamping the base portion in the chuck jaw end groove; and (b) opposing shaft portions attached to and projecting in opposite directions from the base portion and adapted to rotatably seat in recesses formed in the chuck jaw end on opposite sides of the groove therein when the base portion extends into the groove. The shaft portions and the base portion slot have a common central axis and a workpiece engaging notch defined therein extending generally parallel to the common central axis thereof. The base portion is movable in the chuck jaw end groove and the shaft portions are rotatable in the chuck jaw end recesses for adjusting the angular position of the shaft and base portions and thereby of the notch relative to the chuck jaw end before clamping of the base portion in the chuck jaw end groove.

More particularly, each shaft portion is of generally cylindrical shape and the base portion is at least of semi-circular shape. Each shaft portion is smaller in diameter than the base portion such that the base portion projects radially outward from the shaft portions whereby the slot through the base portion partially encircles the shaft portions. Specifically, the base portion has a greater than semi-circular shape, with the slot being closed and having a semi-circular shape. The base portion circumscribes an arc of greater than 180 degrees and less than 240 degrees, and the slot circumscribes an arc of approximately 180 degrees. The notch formed in the base and cylindrical portion is generally V-shaped in cross section to receive a corner of the workpiece. The base and cylindrical portions are of integral one-piece construction.

Also, the present invention is directed to a workpiece holding assembly for use on a chuck. The workpiece holding assembly comprises: (a) a workpiece holder as defined above; and (b) a chuck jaw having an elongated body with opposite ends, a groove defined in one end of the body, and a pair of arcuate recesses formed in the one body end on opposite sides of the groove.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made the attached drawings in which:

FIG. 1 is a perspective view of a chuck having a conventional chuck body equipped with a pair of adjustable workpiece holders and modified jaws of a workpiece holding assembly which embodies the principles of the present invention.

FIG. 2 is an enlarged longitudinal sectional view of one of the modified jaws and the one adjustable workpiece holder attached thereto as line 2—2 of FIG. 1.

FIG. 3 is an enlarged fragmentary front elevational view of the workpiece holders and modified jaws of FIG. 1, showing the workpiece holders gripping an octagonal-shaped workpiece therebetween between.

FIG. 4 is another enlarged fragmentary front elevational view of the workpiece holders and modified jaws of FIG. 1, showing the workpiece holders gripping a square-shaped workpiece therebetween.

FIG. 5 is yet another enlarged fragmentary front elevational view of the workpiece holders and modified jaws of FIG. 1, showing the workpiece holders gripping a rectangular-shaped workpiece therebetween.

FIG. 6 is an exploded view of one modified jaw and one workpiece holder of FIG. 1, showing in phantom one of the members which has a rack of teeth and mounts the jaw to the chuck body.

DETAILED DESCRIPTION OF THE INVENTION

In the following description, like reference characters designate like or corresponding parts throughout the several views of the drawings. Also in the following description, it is to be understood that such terms as "forward", "left", "upwardly", and the like, are words of convenience and are not to be construed as limiting terms.

Referring now to the drawings, and particularly to FIGS. 1, 2 and 6, there is illustrated a chuck 10 of a conventional rotary machining apparatus 12. The chuck 10 has a conventional chuck body 14 equipped with a pair of adjustable self-centering workpiece holders 16 and a pair of modified jaws 18 of a workpiece holding assembly, generally designated 20, which constitutes the preferred embodiment of the present invention. Although only two assemblies 20, being displaced 180 degrees from one another and each composed of one holder 16 and one modified jaw 18, are shown associated with the chuck body 14, it should be understood that a greater number of each could be provided.

The body 14 of the chuck 10 conventionally includes a central opening 22 and a pair of guideways 24 defined in the body 14 and extending radially in opposite directions from the central opening 22. A pair of elongated slide members 26 are slidably mounted in the respective guideways 24. Each member 26 has a rack of transverse teeth 28 defined on the bottom side thereof and has one of the modified jaws 18 attached by screws 30 to the top side thereof. Each member 26 and modified jaw 18 therewith can be moved simultaneously toward or away from each other and the central opening 22 for closing and opening the jaws upon and away from a workpiece. Desired movement of the members 26 and jaws 18 toward or away from one another is achieved by turning a pinion 32 rotatably mounted in the body 14 in one or the other directions. Turning of the pinion 32 causes rotation of a helical track or scroll 34 located within the chuck body 14. The scroll 34 is engaged with the teeth 28 of the slide members 26 such that rotation of the scroll causes linear movement of the slide members 26 and jaws 18 in a known manner.

As mentioned earlier, each workpiece holding assembly 20 used on the chuck body 14 includes one of the modified chuck jaws 18 and one of the adjustable self-centering workpiece holders 16. More particularly, each modified jaw 18 of one holding assembly 20 is composed of an elongated body 36 having opposite ends. As best seen in FIG. 6, a groove 38 is defined in one end of the jaw body 36, and a pair of arcuate recesses 40 are formed in the one body end on opposite sides of the groove 38.

Each adjustable self-centering workpiece holder 16 of one holding assembly 20 includes a shaft portion 42 and a base portion 44 attached about a midsection of the shaft portion 42 such that, preferably, the holder 16 has an integral, one-piece construction. The shaft portion 42 is of a generally cylindrical shape adapted to extend into the spaced arcuate recesses 40 on the one end of the chuck jaw body 36. The base portion 44 is preferably of greater than semi-circular shape and adapted to extend into the groove 38 in the one end of the chuck jaw body 36 located between and inset from recesses 40. The base portion 44 has a flat surface 46 adjacent the side of the shaft portion 42 opposite from the one which extends into the recesses 40. The flat surface 46 of the base portion 44 faces toward the other handling assembly 20. The base portion 44 also has an arcuate slot 48 defined therethrough, being preferably generally semi-circular in shape and of closed configuration. The slot 48 is adapted to receive a pair of fasteners 50 therethrough which are applied through holes 52 recessed and tapped in the one end of the chuck jaw body 36. The fasteners 50 can be unthreadably threaded into the one chuck jaw body end for releasably clamping the base portion 44 in the groove 38.

Further, the shaft and base portions 42, 44 have a common central axis A and an elongated workpiece engaging notch 54 defined therein extending generally parallel to the common central axis A thereof. The notch 54 formed in the shaft and base portions 42, 44 is generally V-shaped in cross section to receive a corner of a workpiece, as depicted in FIGS. 3–5. The shaft portion 42 of the holder 16 is smaller in diameter than the base portion 44 thereof such that the base portion 44 projects radially outward from the shaft portion 42 whereby the slot 48 through the base portion 44 partially encircles the shaft portion 42. The slot 48 in the base portion 44 circumscribes or strikes an arc of approximately 180 degrees which also has its center at axis A. On the other hand, the base portion 44 itself circumscribes or strikes an arc of greater than 180 degrees and less than 240 degrees.

It is seen, therefore, that the base portion 44 is rotatable in the groove 38 and the shaft portion 42 is rotatable in the recesses 40 for adjusting their angular position and thereby the angular position of the notch 54 relative to the one end of the chuck jaw body 36. The clamping force imposed by the fasteners 50 must be released to adjust the angular position of the holder 16. Once it has been rotated to the desired position, the fasteners 50 are tightened to clamp the base portion 44 to the jaw body 36.

The versatility achieved by using the adjustable holding assemblies 20 of the present invention can be appreciated by reviewing the examples of workpieces shown in FIGS. 3–5. Each of the adjustable holding assemblies 20 shown in FIGS. 3–5 are identical to those shown in FIGS. 1, 2 and 6, and so need not be described in detail. The same reference numbers have been applied in FIGS. 3–5 as in FIGS. 1, 2 and 6 to identify their identical parts.

FIG. 3 shows the workpiece holders 16 gripping an octagonal-shaped workpiece O therebetween. FIG. 4 shows the workpiece holders 20 gripping a square-shaped workpiece S therebetween. FIG. 5 shows the workpiece holders 20 gripping a rectangular-shaped workpiece R therebetween.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An adjustable workpiece holder for use on a chuck jaw, comprising:
   (a) a base portion adapted to extend into a groove defined in an end of the chuck jaw, said base portion having an arcuate shaped slot defined therethrough adapted to receive at least one fastener therethrough for releasably clamping said base portion in the chuck jaw end groove; and
   (b) opposing shaft portions attached to and projecting in opposite directions from said base portion and adapted to rotatably seat in recesses formed in the chuck jaw end on opposite sides of the groove therein when said base portion extends into the groove;
   (c) said shaft portions and said base portion slot having a common central axis and a workpiece engaging notch defined therein extending generally parallel to the common central axis thereof;
   (d) said base portion being movable in the chuck jaw end groove and said shaft portions being rotatable in the chuck jaw end recesses for adjusting the angular position of said shaft and base portions and thereby of said notch relative to the chuck jaw end before clamping of said base portion in the chuck jaw end groove.

2. The holder as recited in claim 1, wherein said slot in said base portion circumscribes an arc of approximately 180 degrees.

3. The holder as recited in claim 1, wherein said notch formed in said base and cylindrical portion is generally V-shaped in cross section to receive a corner of the workpiece.

4. The holder as recited in claim 1, wherein said base and cylindrical portions are of integral one-piece construction.

5. The holder as recited in claim 1, wherein base portion has a greater than semi-circular shape, said slot being closed and having a semi-circular shape.

6. The holder as recited in claim 5, wherein said base portion circumscribes an arc of greater than 180 degrees and less than 240 degrees and said slot circumscribes an arc of approximately 180 degrees.

7. The holder as recited in claim 1, wherein each of said shaft portions is of generally cylindrical shape.

8. The holder as recited in claim 1, wherein each of said shaft portions is of generally cylindrical shape and said base portion is of generally semi-circular shape, each of said shaft portions being smaller in diameter than said base portion such that said base portion projects radially outward from said shaft portions whereby said slot through said base portion partially encircles said shaft portions.

9. An adjustable workpiece holder for use on a chuck jaw, comprising:
   (a) a shaft portion of generally cylindrical shape adapted to extend into arcuate recesses formed in a chuck jaw end on opposite sides of a groove formed therein; and
   (b) a base portion of greater than semi-circular shape attached about a midsection of said shaft portion and adapted to extend into the chuck jaw end groove, said base portion having a generally semi-circular closed slot defined therethrough adapted to receive at least one fastener therethrough for releasably clamping said base portion in said chuck jaw end groove;
   (c) said shaft and base portions having a common central axis and a workpiece engaging notch defined therein extending generally parallel to the common central axis thereof;
   (d) said base portion being rotatable in the chuck jaw end groove and said shaft portion being rotatable in the chuck jaw end recesses for adjusting the angular position of said shaft and base portions and thereby of said notch relative to the chuck jaw end before clamping of said base portion in the chuck jaw end groove.

10. The holder as recited in claim 9, wherein said shaft portion is smaller in diameter than said base portion such that said base portion projects radially outward from said shaft portion whereby said slot through said base portion partially encircles said shaft portion.

11. The holder as recited in claim 9, wherein said slot in said base portion circumscribes an arc of approximately 180 degrees.

12. The holder as recited in claim 9, wherein said notch formed in said base and shaft portions is generally V-shaped in cross section to receive a corner of the workpiece.

13. The holder as recited in claim 9, wherein said base and shaft portions are of integral one-piece construction.

14. A workpiece holding assembly for use on a chuck, comprising:
   (a) a chuck jaw having
      (i) an elongated body with opposite ends,
      (ii) a groove defined in one end of the body, and
      (iii) a pair of arcuate recesses formed in the one body end on opposite sides of the groove; and
   (b) an adjustable workpiece holder including
      (i) a shaft portion of generally cylindrical shape adapted to extend into said arcuate recesses of said one chuck jaw body end, and
      (ii) a base portion of greater than semi-circular shape attached about a midsection of said shaft portion and adapted to extend into said groove of said one chuck jaw body end, said base portion having a generally semi-circular closed slot defined therethrough adapted to receive at least one fastener therethrough being fastenable to said one chuck jaw body end for releasably clamping said base portion in said groove,
      (iii) said shaft and base portions having a common central axis and a workpiece engaging notch defined therein extending generally parallel to the common central axis thereof,
      (iv) said base portion being rotatable in said groove of said one chuck jaw body end and said shaft portion being rotatable in said recesses of said one chuck jaw body end for adjusting the angular position of said shaft and base portions and thereby of said notch relative to the chuck jaw body end before clamping of said base portion in said groove thereof.

15. The assembly as recited in claim 14, wherein said shaft portion of said holder is smaller in diameter than said base portion thereof such that said base portion projects radially outward from said shaft portion whereby said slot through said base portion partially encircles said shaft portion.

16. The holder as recited in claim 14, wherein said slot in said base portion of said holder circumscribes an arc of approximately 180 degrees.

17. The holder as recited in claim 14, wherein said notch formed in said base and shaft portions of said holder is generally V-shaped in cross section to receive a corner of the workpiece.

18. The holder as recited in claim 14, wherein said base and shaft portions of said holder are of integral one-piece construction.

19. The holder as recited in claim 14, wherein said base portion of said holder circumscribes an arc of greater than 180 degrees and less than 240 degrees.

* * * * *